(12) United States Patent
Iwashiro

(10) Patent No.: US 6,940,680 B2
(45) Date of Patent: Sep. 6, 2005

(54) METHOD AND APPARATUS FOR HEAD POSITIONING CONTROL IN DISK DRIVE

(75) Inventor: Masafumi Iwashiro, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 318 days.

(21) Appl. No.: 09/949,857

(22) Filed: Sep. 12, 2001

(65) Prior Publication Data

US 2002/0054448 A1 May 9, 2002

(30) Foreign Application Priority Data

Sep. 21, 2000 (JP) ........................................ 2000-286795

(51) Int. Cl.[7] .............................................. G11B 5/596
(52) U.S. Cl. ................................ 360/77.07; 360/78.01
(58) Field of Search ................................ 360/75, 77.07, 360/77.04, 78.09, 77.08, 78.14, 318/560; 702/191; 369/43, 44.32

(56) References Cited

U.S. PATENT DOCUMENTS

| 5,909,341 | A |   | 6/1999  | Hikosaka et al. |
|-----------|---|---|---------|-----------------|
| 5,909,661 | A | * | 6/1999  | Abramovitch et al. ...... 702/191 |
| 5,930,067 | A |   | 7/1999  | Andrews et al. |
| 5,946,158 | A |   | 8/1999  | Nazarian et al. |
| 6,166,875 | A | * | 12/2000 | Ueno et al. ............... 360/77.04 |
| 6,417,983 | B1 | * | 7/2002  | Yatsu ...................... 360/77.04 |
| 6,456,452 | B1 | * | 9/2002  | Hobson et al. .......... 360/78.07 |

FOREIGN PATENT DOCUMENTS

JP  2000-195202  7/2000

* cited by examiner

*Primary Examiner*—David Hudspeth
*Assistant Examiner*—Daniell L. Negrón
(74) *Attorney, Agent, or Firm*—Pillsbury Winthrop Shaw Pittman LLP

(57) ABSTRACT

A servo system is disclosed which is applied to a disk drive for detecting characteristic frequency components of a position error between a position of the head and the target position, and calculating a control correction value for correcting a control value. The servo system estimates the frequency components of target value variation from the characteristic frequency components of the position error, thereby modifying the characteristic frequency components to follow the target value variation. Thus, the servo system calculates the control correction value for suppressing the target value variation, and executes head positioning control, using a value obtained by adding the control value to the control correction value.

5 Claims, 6 Drawing Sheets

METHOD AND APPARATUS FOR HEAD POSITIONING CONTROL IN DISK DRIVE

CROSS-REFERENCE TO RELATED APPLICATION

This application is basede upon and claims the benefit of priority from the prior Japanese Patent Application No. 2000-286795, filed Sep. 21, 2000, the entire contents of which are incorporated herein by reference.

BACKGROUND OF THE INVENTION

1. Field of the Invention

The present invention relates to a head positioning control system, for use in a disk drive, for situating a head in a target position, and more particularly to a servo system for executing track following control to position the head on a predetermined portion of a target track of a disk.

2. Description of the Related Art

A disk drive represented by a hard disk drive employs a servo system for situating a head in a target position (on a track to be accessed) on a disk as a data recording medium. The servo system uses servo data read by the head from a servo area provided on the disk so as to control an actuator (i.e. a plant) that mounts the head thereon. The servo system executes a seek operation for moving the head to a target track by controlling the actuator, and a track following operation for positioning the head on a predetermined portion of a target track. In this description, the system that executes the track following operation is called a "head positioning control system".

In light of the above, a head positioning control system is now proposed, in which the position error following performance is improved when a target value fluctuates at a characteristic frequency. The system is disclosed in U.S. patent application Ser. No. 09/389,367 and Japanese Patent Application KOKAI Publication No. 2000-195202.

BRIEF SUMMARY OF THE INVENTION

It is an object of the present invention to provide a head positioning control system applicable to an actual disk drive and capable of estimating the frequency components of a target value variation even if the frequency components are not characteristic ones, and hence exhibiting a sufficient following performance with respect to the target value variation.

To attain the object, there is provided a positioning control system applicable to a disk drive, comprising: a position error detector that detects a position error between a position of the head and the target position; a frequency detector that detects a characteristic frequency component included in the position error, using a Fourier transform; an estimator that estimates a frequency of a disturbance, related to a target value variation, on the basis of a Fourier coefficient resulting from the Fourier transform; and a controller that modifies the characteristic frequency component on the basis of the frequency of the disturbance estimated by the estimator, and calculates a control correction value for suppressing the target value variation having the modified characteristic frequency component.

In other words, the system of the present invention includes a feed forward control system for detecting a characteristic frequency component of a position error signal corresponding to a position error from a target position, using a Fourier transform, and calculating a control correction value from the detected frequency component. This system calculates the control correction value for suppressing target value variation having no characteristic frequency components, by modifying the frequency component in accordance with the frequency component of the target value variation (disturbance).

Where this structure is used in an actual disk drive, even if target value variation occurs due to a disturbance whose frequency components cannot be determined, the frequency components of the target value variation (disturbance) are estimated, with the result that a sufficient following performance is secured with respect to the target value variation. The disturbance indicates the factor of the target value variation, whose frequency components cannot be determined, such as the resonance of the base table (casing) of the drive or a vibration from, for example, the bearing of a spindle motor that rotates the disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiment of the present invention will be described with reference to the accompanying drawings.

Figure 1:
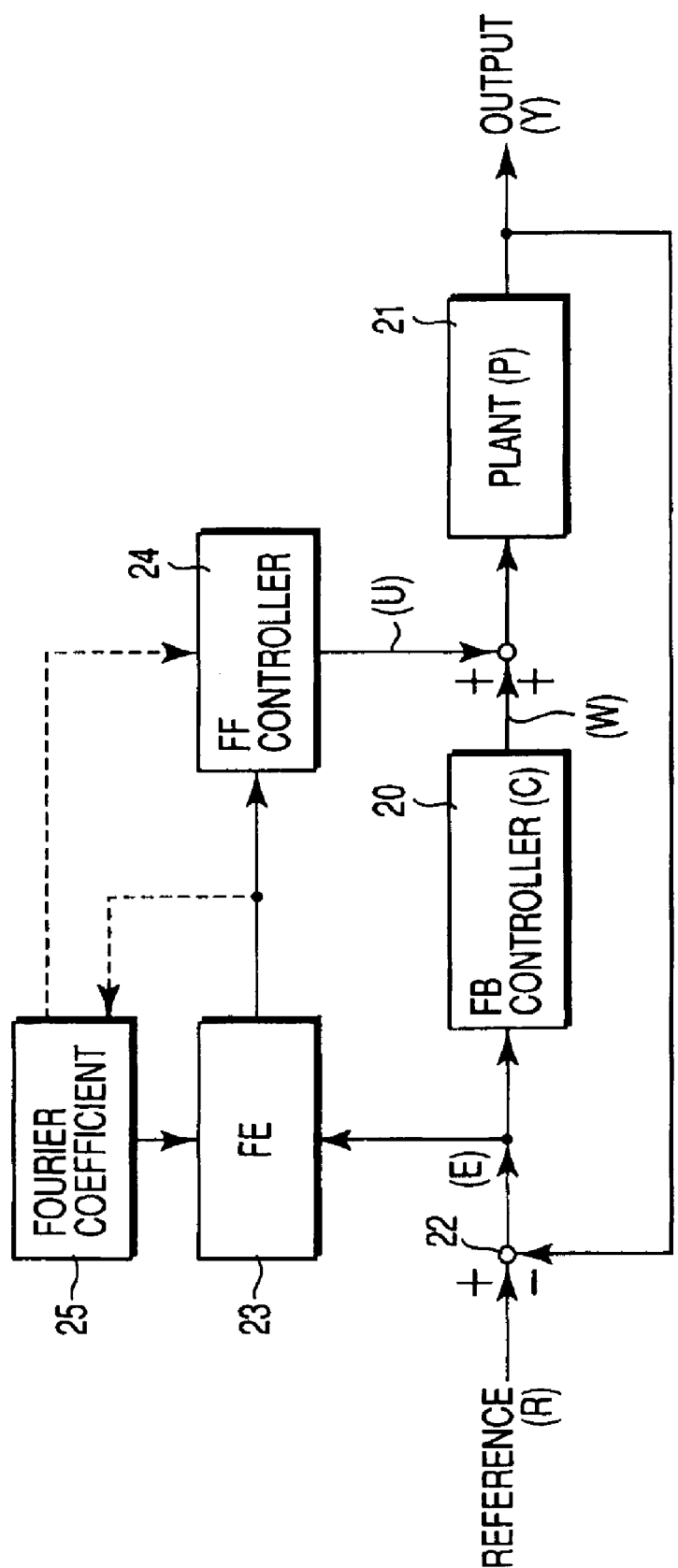
FIG. 1 is a block diagram illustrating the structure of a head positioning control system according to the embodiment of the present invention.
Figure 2:
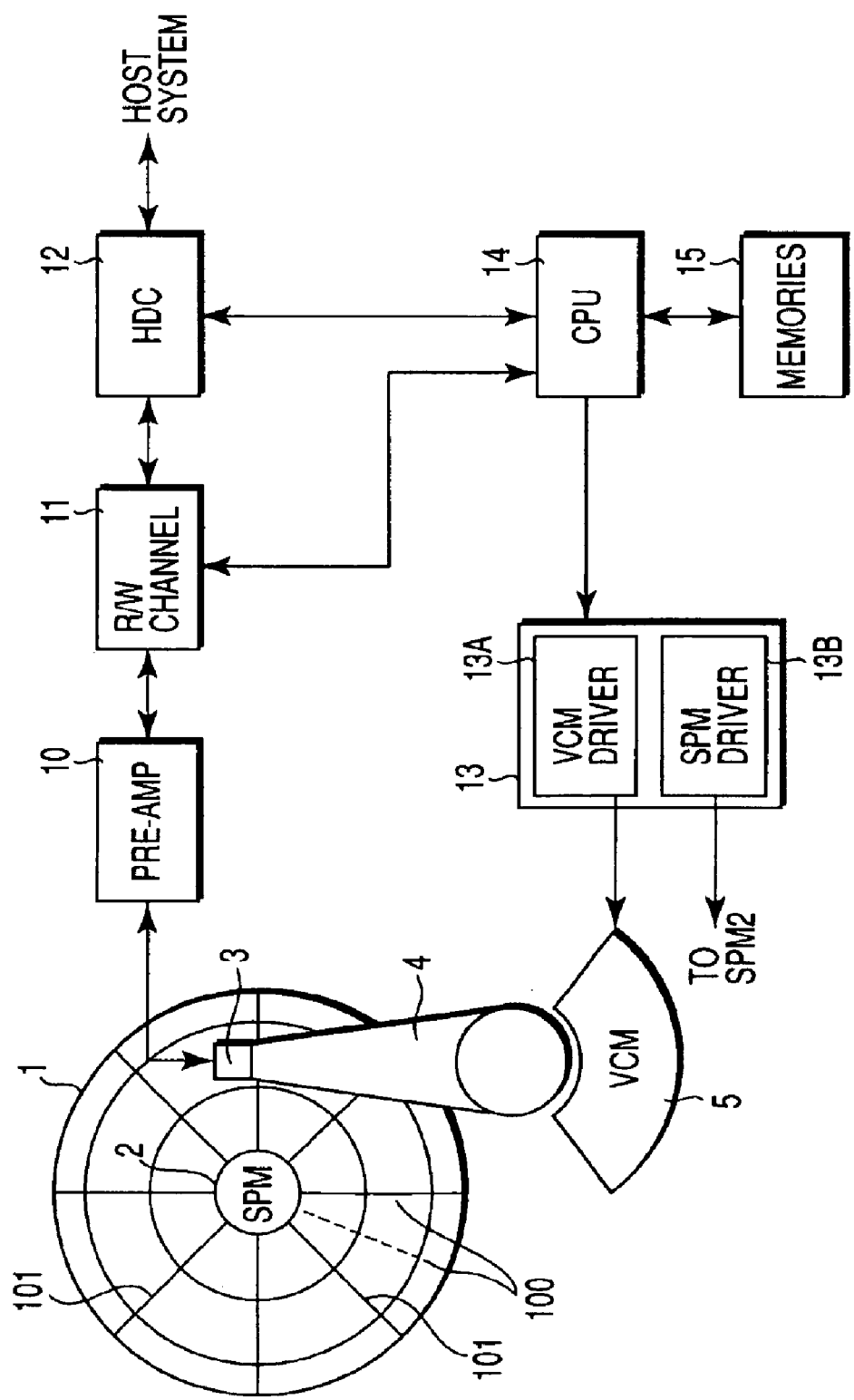
FIG. 2 is a block diagram illustrating an essential part of a disk drive appearing in FIG. 1.

FIG. 1 is a schematic block diagram illustrating a head positioning control system according to the embodiment. Further, FIG. 2 is a block diagram illustrating an essential part of a disk drive appearing in FIG. 1.

(The Structure of the Disk Drive)

In the embodiment, it is supposed that the head positioning control system is applied to a servo system incorporated in the disk drive. As seen from FIG. 2, the servo system of the disk drive has a microprocessor (CPU) 14 as a main element, and executes a seek operation for moving a head 3 to a target track, and also executes a track following operation, using the head positioning control system.

The disk drive mainly comprises a head/disk assembly, a signal processing circuit and the servo system. The head/disk assembly includes a disk 1 as a data recording medium, the head 3 and an actuator having the head 3 mounted thereon.

The disk 1 is attached to a spindle motor (SPM) 2 and can rotate at a high speed. The disk 1 prestores servo data usually written by a dedicated unit called a "servo writer". The servo data is recorded in the servo areas 101 of the disk 1 arranged at regular circumferential intervals. Each servo area 101 serves as the leading area of a plurality of data sectors provided on a corresponding data track 100. A large number of data tracks 100 are radially concentrically provided on the disk 1. The range defined between each servo area 101 and a predetermined number of corresponding data sectors is sometimes called a "servo sector".

The servo data mainly comprises a track code (cylinder number), servo burst data and a servo sector number. The track code is a track address for recognizing a data track. The servo burst data is position error data used for a track following operation executed to position the head 3 in the data track. The servo sector number is a sector address for recognizing the servo sector (data sector).

The head 3 is mounted on the actuator. The actuator mainly comprises an arm 4 including a suspension that holds the head 3, and a voice coil motor (VCM) 5 for radially driving the arm 4 over the disk 1. The actuator is driven by a servo system, described below, to execute the seek operation and the track following operation. The VCM 5 is driven by a driving current supplied from a VCM driver 13A. The actuator corresponds to a target (plant) 21 to be controlled by a head positioning control system described below.

The signal processing circuit has a pre-amplifier circuit 10 and a read/write channel 11. The pre-amplifier circuit 10 includes a read amplifier for amplifying a read signal read by the head 3, and a write amplifier for converting write data into a write current. The read/write channel 11 has a function of reproducing servo data read by the head 3 and supplying it to the CPU 14. The disk controller (HDC) 12 constitutes an interface between the drive and a host system (a personal computer or a digital device), and executes, for example, transfer control of read/write data.

As aforementioned, the servo system has the CPU 14 as a main element. The CPU 14 executes the seek operation and controls the head positioning control system described below (executes a track following operation) in accordance with the control programs prestored in a ROM that is incorporated in the memory 15. The CPU 14 converts, into a digital signal, a position error signal (E) based on the servo data reproduced by the read/write channel 11, and inputs the digital signal.

The CPU 14 further supplies the VCM driver 13A with a calculated control operation amount (which corresponds, in this embodiment, to a value obtained by adding a control value (W) to a control correction value (U)). The VCM driver 13A converts the control operation amount from the CPU 14 into a driving current, using a D/A converter incorporated therein, and supplies it to the VCM 5. The VCM driver 13A and an SPM driver 13B for the spindle motor 2 constitute an integrated circuit that serves as a motor driver 13.

(The Structure of the Head Positioning Control System)

As shown in FIG. 1, the head positioning control system comprises a feedback control system that has an FB controller 20 as a main element, and a feed forward control system that has an FF controller 24 as a main element. This head positioning control system is actually realized by the above-described CPU 14.

The FB controller 20 calculates the control value (W) for correcting a position error (E) between a head position (Y) and a target position (R), on the basis of an output from a position error detector 22. The feedback control system uses, as a control value for the plant 21, a value obtained by adding the control value (W) to the control correction value (U) from the FF controller 24. The FF controller 24 calculates the control correction value (U) for compensating the target value variation component.

The feed forward control system has a characteristic frequency component detector 23 and a Fourier coefficient estimator 25, in addition to the FF controller 24. The characteristic frequency component detector 23 detects the characteristic frequency components (sine and cosine components) of variation (disturbance) in target value on the basis of the position error signal (E), using a Fourier transform. The Fourier coefficient estimator 25 has a function of adjusting a frequency expressed by each Fourier coefficient to thereby estimate the frequency components of the position error signal that contains the frequency components of the actual target value variation (disturbance). The characteristic frequency component detector 23 modifies the detected frequency components on the basis of the frequency components estimated by the Fourier coefficient estimator 25, and supplies them to the FF controller 24.

(The Operation of the Head Positioning Control System)

Figure 7A:
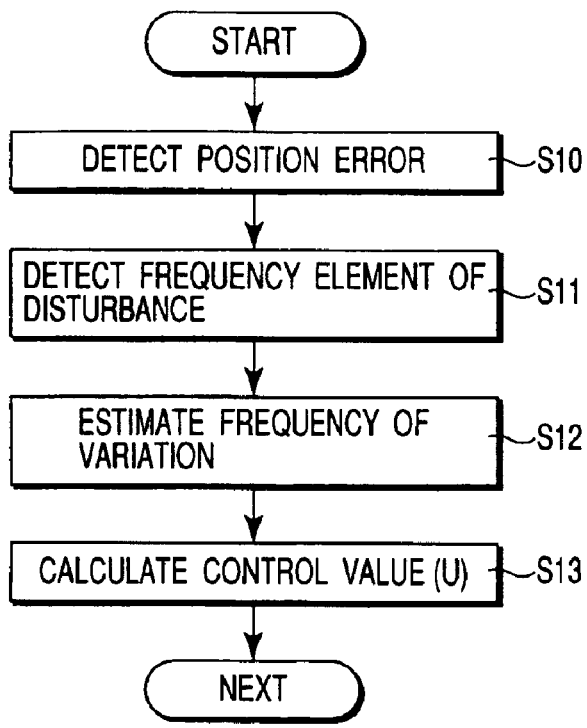
FIGS. 7A and 7B are flowcharts useful in explaining the operation of the system of the embodiment.

As described above, this system executes the track following operation for positioning the head 3, already moved to a target track of the disk 1 by the seek operation, on a predetermined portion of the target track. Referring now to the flowchart of FIG. 7A, the operation of the system will be described roughly.

The position error detector 22 detects a position error signal (E) indicative of a position error between the target position (R) and the actual position. (Y) of the head (step S10). The FB controller 20 inputs the position error signal (E) detected by the position error detector 22 at regular sampling intervals, thereby calculating the control value (W) for correcting the position error signal (E) indicative of the position error between the target position (R) and the head position (Y). In other words, the FB controller 20 constitutes a sampled data control system. Further, the maximum input value for the plant 21 is limited by its mechanical and electrical specifications.

On the other hand, in the feed forward control system, the characteristic frequency component detector 23 executes a Fourier transform to detect the characteristic frequency components (sine and cosine components) of variation (disturbance) in target value on the basis of the position error signal. (E) (step S11). Specifically, since a synchronous component contained in the position error signal (E) and synchronous with the rotation cycle of the disk can be detected as a cycle function, it can be developed in the form of a Fourier series.

Figure 3:
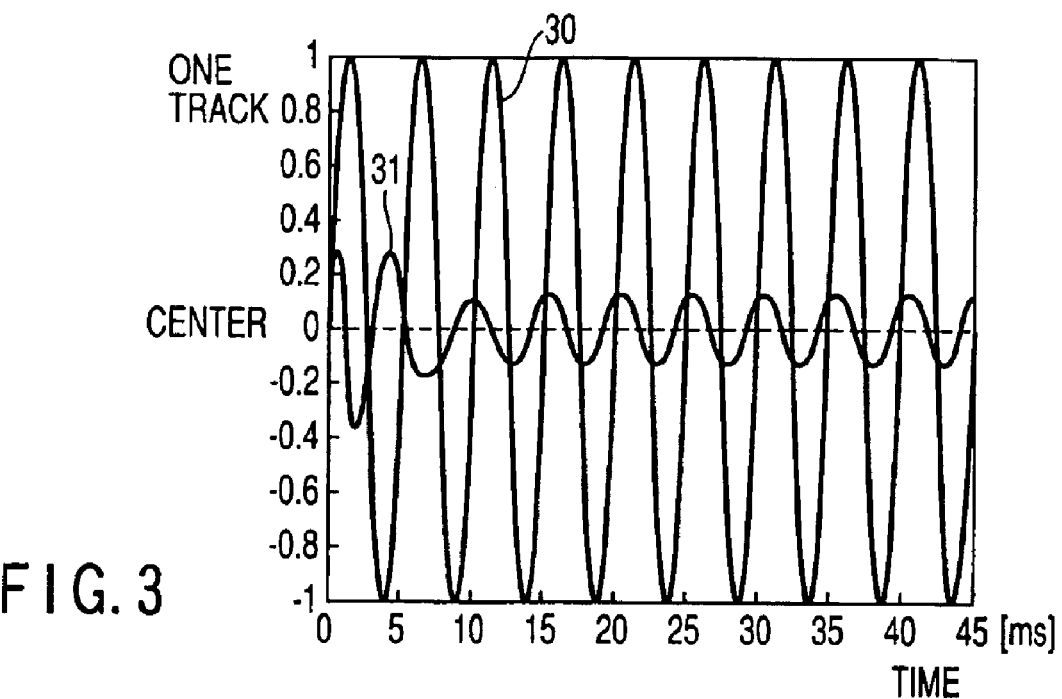
FIG. 3 is a graph showing a relationship between a target value variation and a position error variation in the embodiment.

If the frequency to be detected by the characteristic frequency detector 23 is, for example, 210 Hz, and the frequency of the actual target value variation due to a disturbance is, for example, 200 Hz, the orbit of the position error is as shown in FIG. 3. FIG. 3 shows the relationship between a target value variation (indicated by curve 30) in one track, and a position error variation (indicated by curve 31) in the track following operation. As is confirmed from FIG. 3, even if the difference (i.e. position error) between the detected frequency and the actual frequency of the target value variation is about 10 Hz, the position error does not converge on 0 corresponding to the track center line, which means that the following performance is degraded. If the position error is about 30 Hz, the compensation function of the FF controller 24 is almost invalid, and the effect of the case of using the FF controller 24 and the FB controller 20 is almost the same as that of the case of using only the FB controller 20.

In light of this, in the system of the embodiment, the Fourier coefficient estimator 25 estimates the frequency of the actual target value variation (i.e. the frequency of the position error signal E) (step S12). On the basis of the estimated frequency, the characteristic frequency component detector 23 modifies the detected frequency and outputs the modification result to the FF controller 24. The FF controller 24 calculates the control correction value (U) on the basis of the frequency of the actual, target value variation (step S13).

Figure 8:
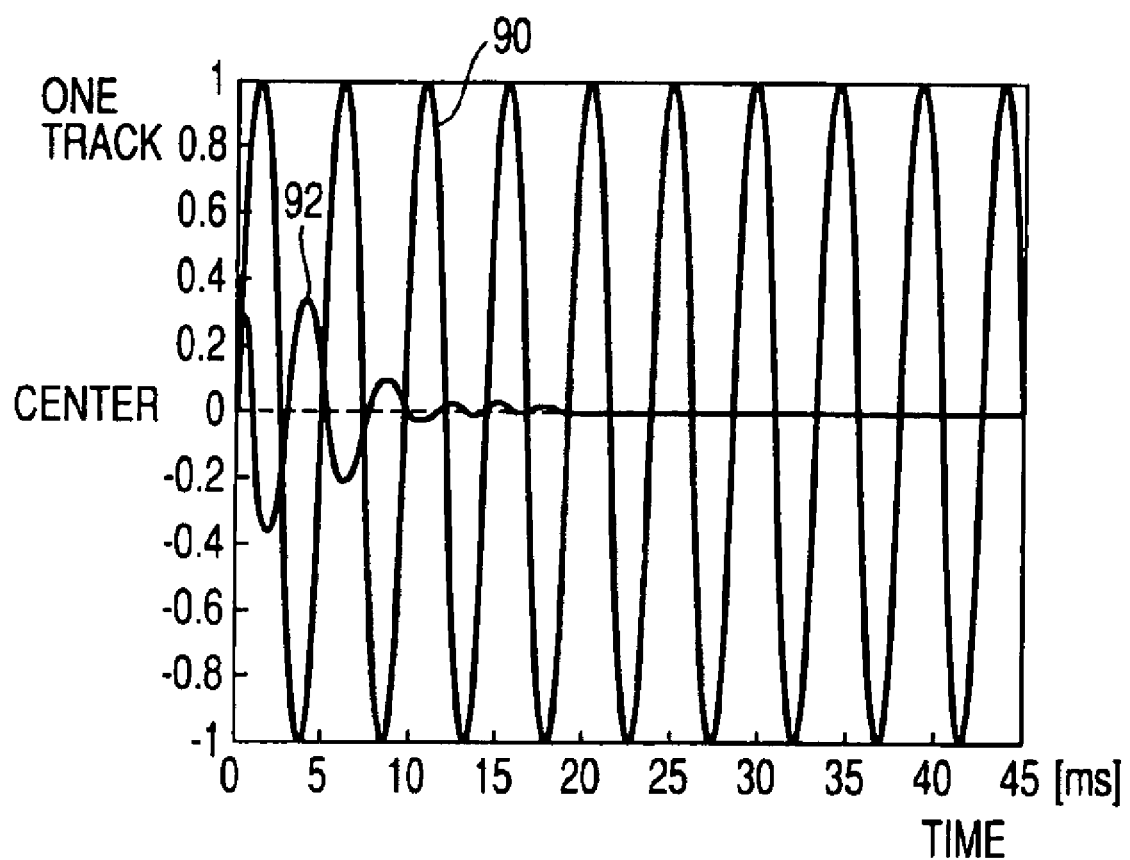
FIG. 8 is a graph illustrating the relationship between a target value variation and a position error variation.

Referring then to FIG. 8, a description will be given of the operation principle of a conventional system equipped, in particular, with the characteristic frequency detector 23.

The following performance of the system with respect to the position error (E) from the target value (R) is determined by a relational expression called a "sensitivity function" as given by the following equation (1):

$$\frac{e}{r} = \frac{1}{1+PC} \quad (1)$$

where P represents the transfer function of the plant 21, C that of the FB controller 20, r the target position (R), and e the position error (E). In other words, the sensitivity function enables the compression ratio of the position error (E) to the target position (R) to be detected for each frequency component.

The system shown in FIG. 10 has a characteristic frequency detector 23 for executing a Fourier transform to thereby detect the characteristic frequency components (sine and cosine components) of target value variation on the basis of the position error signal (E). This system also has a feed forward control section (FF controller) 24 for calculating a control correction value (U) that is used to compensate the target value variation component on the basis of the detected characteristic frequency components. This system uses, as a control value for the plant 21, a value obtained by adding the control value (W) calculated by the FB controller 20 to the control correction value (U).

Supposing that the position error e(t) fluctuates at a cycle T, the following equation (2) is established:

$$e(t) = a\sin\frac{2\pi}{T}t + b\cos\frac{2\pi}{T}t \quad (2)$$

Fourier coefficients a and b obtained when subjecting the position error e(t) to a Fourier transform are expressed by the following equations (3):

$$a = \frac{2}{T}\int_{-\frac{T}{2}}^{\frac{T}{2}} e(t)\sin\frac{2\pi}{T}t\,dt, \quad (3)$$
$$b = \frac{2}{T}\int_{-\frac{T}{2}}^{\frac{T}{2}} e(t)\cos\frac{2\pi}{T}t\,dt$$

However, since the position error e is actually obtained as discrete information as a result of A/D conversion, the Fourier coefficients a and b are given by the following equations (4):

$$ak = \frac{2T_S}{T}\sum_{i=1}^{\frac{T}{T_S}} e(i)\sin\frac{2\pi}{T}t(i), \quad (4)$$
$$b = \frac{2T_S}{T}\sum_{i=1}^{\frac{T}{T_S}} e(i)\cos\frac{2\pi}{T}t(i)$$

Furthermore, if those changes in the Fourier coefficients, which have been obtained from the position error e(k) at present, are added to respective Fourier coefficients a(k−1) and b(k−1) obtained one sampling before, Fourier coefficients a(k) and b(k) can be calculated as shown in the following equations (5):

$$a(k) = a(k-1) + \frac{2T_S}{T}e(k)\sin\frac{2\pi}{T}t(k) \quad (5)$$
$$b(k) = b(k-1) + \frac{2T_S}{T}e(k)\cos\frac{2\pi}{T}t(k)$$

Sequential detection of position error information based on the formula (5) enables the detection of the sine and cosine components as the characteristic frequency components at present. From the sine and cosine components as the characteristic frequency components of the target value variation detected by the characteristic frequency component detector 23, the FF controller 24 calculates the control correction value (U) (in the formula, it is represented by u). The transfer function for the control correction value u and the position error e is given by the following equation (6):

$$\frac{e}{u} = \frac{P}{1+PC} \quad (6)$$

To correct the position error e due to the cyclic target value variation, it is sufficient if a position error (−e) of the opposite phase is created using the control correction value u. Accordingly, the following equation (7) is established:

$$u = \frac{1+PC}{P}e \quad (7)$$

Since it is supposed that the position error e fluctuates at a cycle of T, if a gain g and a phase are considered at a frequency of (1/T) in the transfer function of the equation (7), the control correction value u(k) can be calculated from the following equation (8):

$$u(k) = g \cdot a(k)\sin\left(\frac{2\pi}{T}t(k)+\phi\right) + g \cdot b(k)\cos\left(\frac{2\pi}{T}t(k)+\phi\right) \quad (8)$$

FIG. 8 shows a following orbit (indicated by curve 92) with respect to the position error e, obtained when the target value fluctuates at a frequency of 210 Hz (as indicated by curve 90) and the FF controller 24 executes the compensation operation based on the control correction value u. As is evident from this following orbit, the position error converges substantially 0. This means that the system shown in FIG. 10 can follow cyclic variation in target value. (The operation principle of the Fourier coefficient estimator)

A description will now be given of the operation principle of the Fourier coefficient estimator 25 in the system that includes the above-described characteristic frequency component detector 23.

If the frequency fa of actual target value variation differs form a frequency f detected by the detector 23, a component indicative of the difference |fa−f| in the frequencies is contained in the Fourier coefficients a(k) and b(k) in the equation (5). The following equation (9) expresses a position error that fluctuates at a cycle Ta=1/fa.

$$e'(t) = a\sin\frac{2\pi}{T_a}t + b\cos\frac{2\pi}{T_a}t \tag{9}$$

From the formula (9), the Fourier coefficient a(k) is expressed by the following equation (10):

$$a(k) = a(k-1) + \frac{2T_S}{T}\left(a\sin\frac{2\pi}{T_a}t + b\cos\frac{2\pi}{T_a}t\right)\sin\frac{2\pi}{T}t(k) \tag{10}$$

$$= a(k-1) + \frac{aT_S}{T}\left(-\cos\left(2\pi t(k)\left(\frac{1}{T_a}+\frac{1}{T}\right)\right) + \left(2\pi t(k)\left(\frac{1}{T_a}-\frac{1}{T}\right)\right)\right) +$$

$$\frac{bT_S}{T}\left(\sin\left(2\pi t(k)\left(\frac{1}{T_a}+\frac{1}{T}\right)\right) - \sin\left(2\pi t(k)\left(\frac{1}{T_a}-\frac{1}{T}\right)\right)\right)$$

Accordingly, the sequential detected values a(k) and b(k) fluctuate at a frequency given by the following equation (11):

$$\left|\frac{1}{T_a} - \frac{1}{T}\right| = |f_a - f| \tag{11}$$

Figure 4:
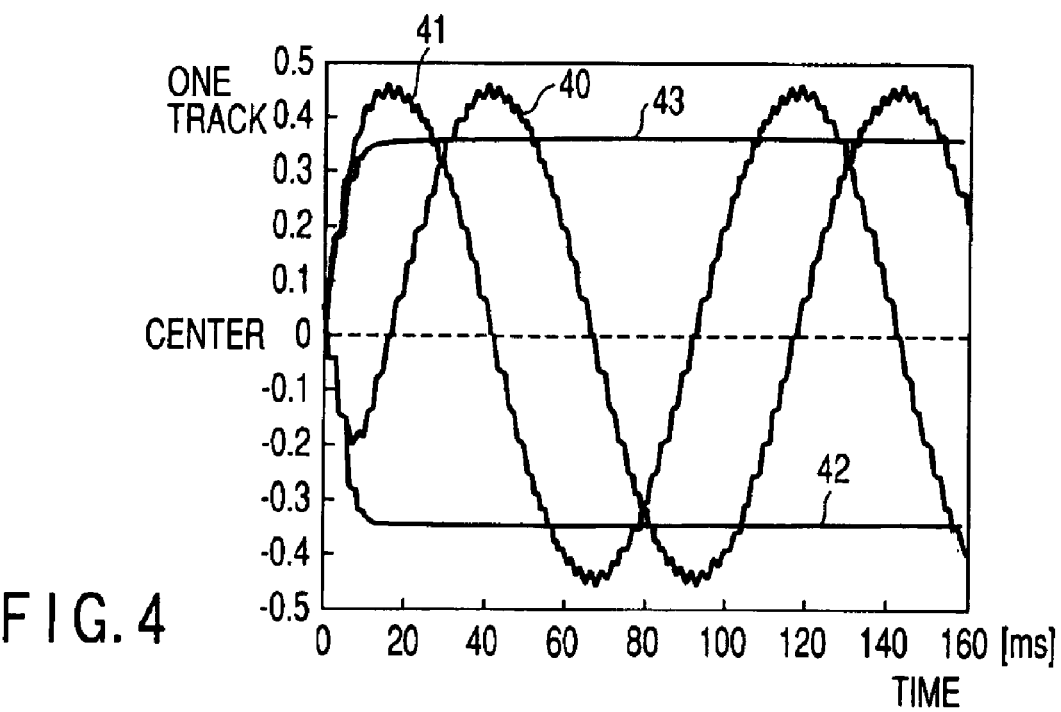
FIG. 4 is a graph showing variation with time of the detected values of Fourier coefficients in the embodiment.

FIG. 4 shows variation with time in the detected Fourier coefficient between a case where the frequency of target value variation is equal to a detected one (210 Hz in this case), a case where they differ from each other (the frequency of the target value variation is 200 Hz). Specifically, in FIG. 4, curves 40 and 41 indicate the Fourier coefficient a(k) and the Fourier coefficient b(k), respectively, obtained where the frequency of the target value variation is 200 Hz (the frequencies differ from each other). Further, curves 42 and 43 indicate the Fourier coefficient a(k) and the Fourier coefficient b(k), respectively, obtained where the frequency of the target value variation and the detected one are both 210 Hz.

As is evident from FIG. 4, where they are both 210 Hz, the sequentially detected Fourier coefficients converge immediately after (approx. 20 ms after) the track following operation is started. On the other hand, where they differ from each other, the sequentially detected Fourier coefficients fluctuate at a cycle of 100 ms (the frequency difference is 10 Hz). From variation with time in the sequentially detected Fourier coefficients, the difference |fa−f| between the frequencies can be estimated.

Figure 7B:
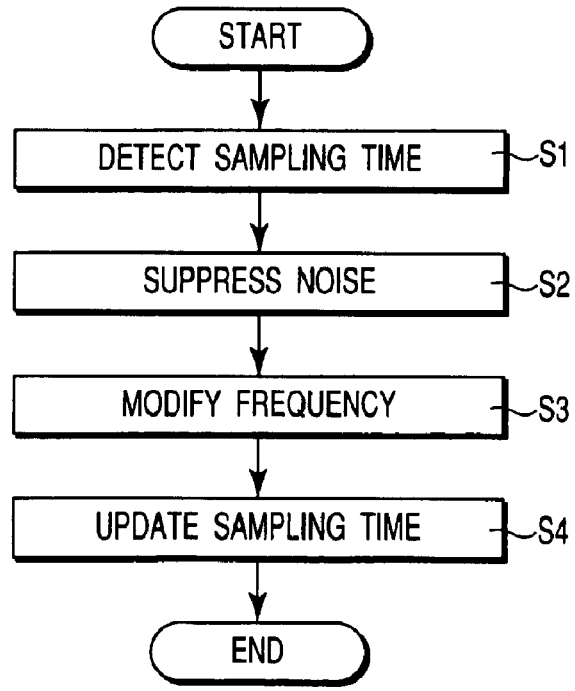

On the basis of the above-described principle, the Fourier coefficient estimator 25 executes Fourier coefficient estimation as shown in the flowchart of FIG. 7B. At first, it detects a sampling point, at which the Fourier coefficient a(k) is 0 (step S1). Subsequently, noise elimination is executed to determine an effective sampling point (step S2). More specifically, the cycle of the sequentially detected Fourier coefficients is as long as from dozens to several hundreds of milliseconds. Further, a signal having a high frequency of |(1/Ta)+(1/T)| is simultaneously generated as shown in the formula (10). Accordingly, only if the difference between a sampling point in time (kp) at which the previous Fourier coefficient a(k) is 0, and the present sampling point (k) is larger than a constant value n (i.e. if k−kp>n), it is determined that the present sampling time point is valid.

At the valid sampling time point, the Fourier coefficient estimator 25 modifies (adjusts) the frequency detected by the characteristic frequency component detector 23, to the frequency of the actual target value variation on the basis of the estimated frequency difference (step S3). To determine a valid sampling time point at which the next Fourier coefficient a(k) is 0, the sampling point (kp) is updated (step S4).

Figure 5:
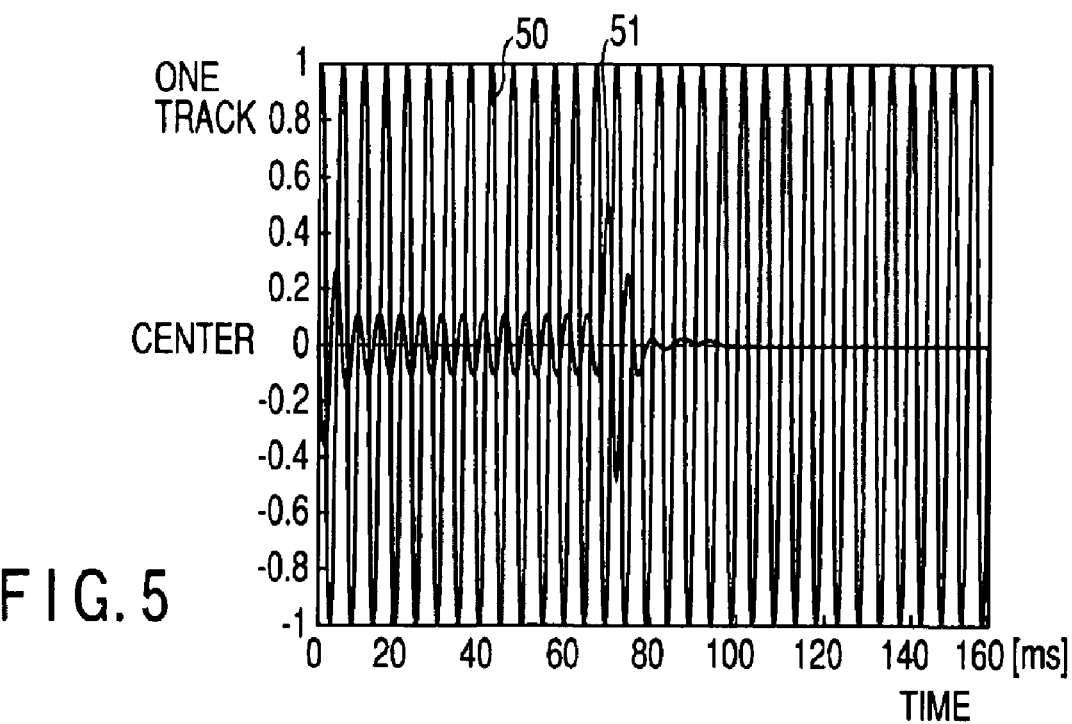
FIG. 5 is a graph showing another relationship between a target value variation and a position error variation in the embodiment.

FIG. 5 is a graph showing a case where the frequency initially detected by the characteristic frequency component detector 23 is 210 Hz, the frequency of the actual target value variation is 200 Hz, and the Fourier coefficient estimator 25 has changed the frequency detected by the detector 23 to the estimated frequency of the target value variation. In other words, FIG. 5 shows the relationship between a target value variation in one track (indicated by curve 50) and a position error variation caused by the track following operation (indicated by curve 51). As is confirmed from FIG. 5, even if there is a difference or error (approx. 10 Hz) between the detected frequency and the frequency of target value variation, the orbit of the position error converges 0, i.e. on the center of a track.

Figure 6:
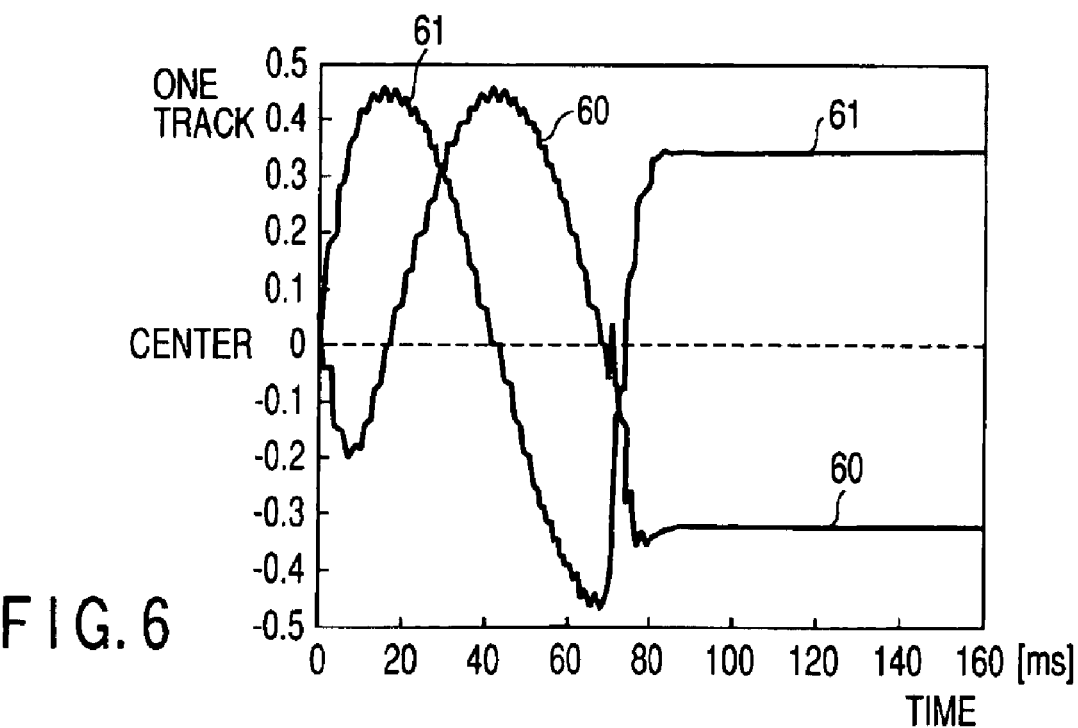
FIG. 6 is a graph useful in explaining the operation of a Fourier coefficient estimator employed in the embodiment.

FIG. 6 shows variation with time in sequentially detected Fourier coefficient, curves 60 and 61 indicating the Fourier coefficient a(k) and the Fourier coefficient b(k), respectively. As seen from FIG. 6, the Fourier coefficient a(k) is 0 at sampling time points of 20 ms and 70 ms, which means that a deviation of half the cycle (50 ms) occurs. In light of this, the Fourier coefficient estimator 25 changes the frequency to be detected by the detector 23 from 210 Hz to 200 Hz so as to make the Fourier coefficients a(k) and b(k) constant and thereby converge the position error to 0.

In the system equipped with the FF controller 24 for calculating the control correction value (U) on the basis of the frequency detected by the characteristic frequency component detector 23, the above-described structure enables the control correct value (U) to correspond to the frequency of actual target value variation (disturbance). In other words, the difference between the frequency of the actual target value variation and a to-be-detected frequency is estimated, thereby modifying the frequency detected by the characteristic frequency component detector 23 on the basis of the estimated frequency difference. As a result, even if target value variation occurs due to a disturbance whose frequency cannot be determined, the FF controller 24 can calculate the control correction value (U) that can effectively suppress the target value variation (disturbance). Thus, the system of the present invention can exhibit a sufficient following performance with respect to target value variation.

(Modification)

The above-described embodiment can be modified such that the Fourier coefficient estimator 25 estimates a plurality of disturbance frequencies as candidates, thereby selecting the frequency candidate that shows a minimum position error, and using this candidate as the frequency detected by the characteristic frequency component detector 23. In this case, the system executes position control (track following operation) for each estimated frequency candidate, thereby estimating the position error and selecting a minimum position error.

As described above in detail, the head positioning control system of the present invention for executing, in particular, a track following operation can exhibit a sufficient following performance with respect to target value variation, if it occurs due to a disturbance whose frequency cannot be determined, by estimating the frequency component of the target value variation. Accordingly, when this system is applied to actual disk drives, it can show a sufficient following performance with respect to target value variation due to the occurrence of a disturbance that differs between the disk drives. Thus, a highly accurate servo system can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A positioning control system situating head in a target position on a disk incorporated in a disk drive, comprising:

a position error detector that detects a position error between a position of the head and the target position;

a frequency detector that detects a characteristic frequency component included in the position error, using a Fourier transform;

an estimator that estimates a frequency of a disturbance related to a target value variation based on a Fourier coefficient resulting from the Fourier transform, the estimator estimating a plurality of frequencies as candidates for the frequency of the disturbance and positioning control being executed for each frequency candidate estimated by the estimator, to estimate a position error for said each frequency candidate; and a controller that modifies the characteristic frequency component based on the frequency of the disturbance estimated by the estimator, and calculates a control correction value for suppressing the target value variation having the modified characteristic frequency component, wherein the controller selects one of the estimated frequency candidates which shows a minimum position error and uses the selected frequency candidate as the frequency detected by the frequency detector.

2. A head positioning control method for use in a disk drive, comprising:

detecting a position error between a position of the head and the target position;

detecting a characteristic frequency component included in the position error, using a Fourier transform;

estimating a frequency of a disturbance related to a target value variation based on a Fourier coefficient resulting from the Fourier transform, by estimating a plurality of frequencies as candidates for the frequency of the disturbance;

modifying the characteristic frequency component on the basis of the estimated frequency of the disturbance; and calculating a control correction value that suppresses the target value variation having the modified characteristic frequency component.

3. The positioning control system according to claim 1, wherein the controller executes head positioning control using a value obtained by adding the control correction value to a control value that corrects the position error.

4. The positioning control system according to claim 1, wherein the estimator estimates the frequency of the disturbance that is not synchronous with a cycle of rotation of the disk.

5. The positioning control system according to claim 1, wherein the disk drive has an actuator that moves the head to the target position on the disk, and a servo system that drives the actuator, the servo system including the position error detector, the frequency detector, the estimator and the controller.

* * * * *